United States Patent
Cretors

[15] 3,645,422
[45] Feb. 29, 1972

[54] FEEDER APPARATUS FOR METERING A PREDETERMINED AMOUNT OF PRODUCT

[72] Inventor: Charles De Witt Cretors, Deerfield, Ill.
[73] Assignee: C. Cretors & Co., Chicago, Ill.
[22] Filed: Mar. 30, 1970
[21] Appl. No.: 23,580

[52] U.S. Cl. .................................222/169, 222/282
[51] Int. Cl. ..............................................B65d 83/06
[58] Field of Search..............222/167, 169, 282, 438, 434; 99/238.5; 259/14

[56] References Cited

UNITED STATES PATENTS 1,221,136  4/1917  Boudwin.................................222/167
3,458,326  7/1969  Nicolaus et al. .........................99/235

Primary Examiner—Samuel F. Coleman
Assistant Examiner—John P. Shannon, Jr.
Attorney—Pendleton, Neuman, Seibold & Williams

[57] ABSTRACT

A rotatable feeder apparatus for metering a predetermined amount of product is provided which can be removably mounted on a cooking machine. The apparatus includes a casing which forms a chamber and has an inlet port for receiving a feed tube and a discharge outlet port. An adjustable product volume control is disposed within the casing and forms a measuring area for controlling the amount of product conveyed to the discharge outlet port per revolution of the feeder.

6 Claims, 7 Drawing Figures

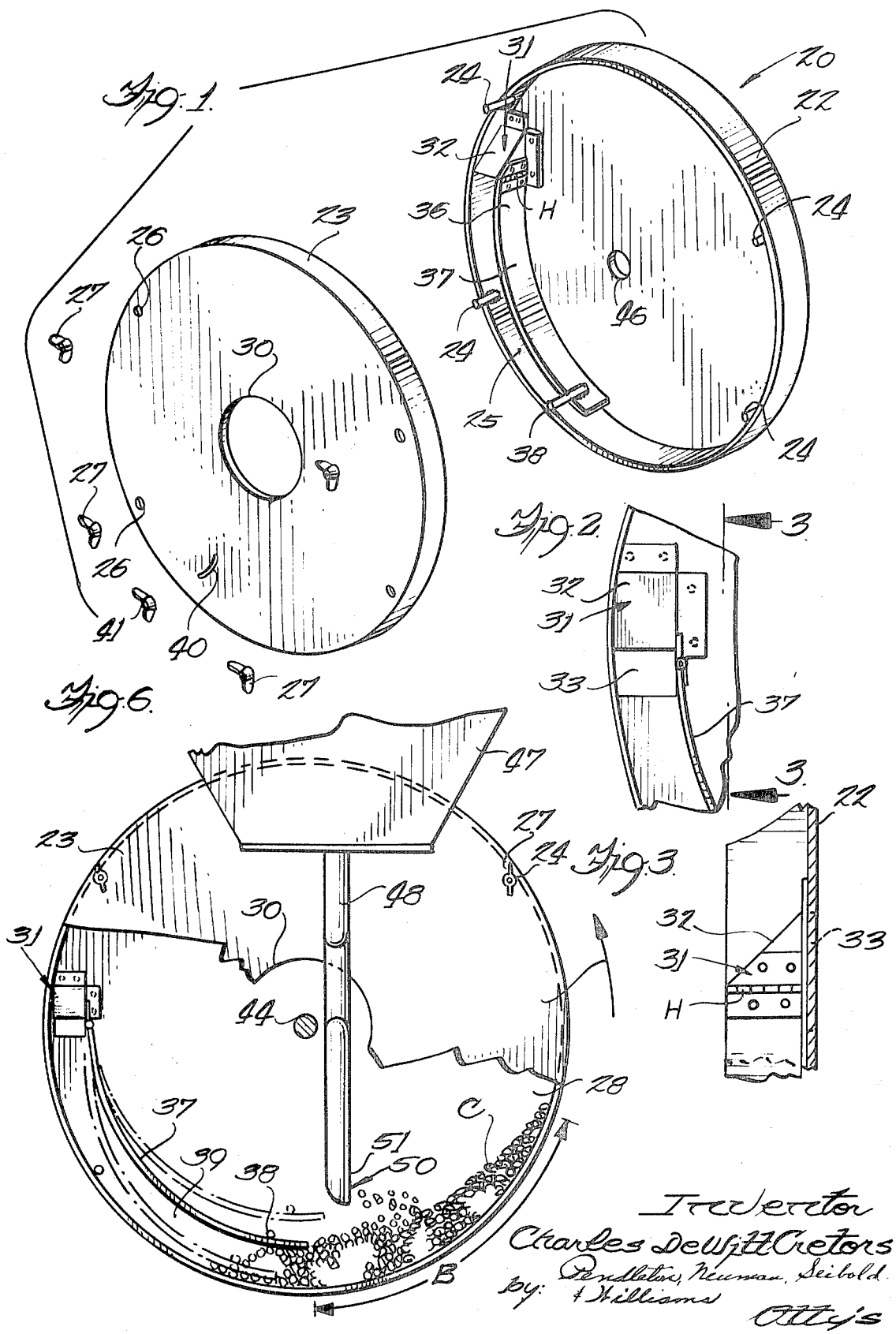

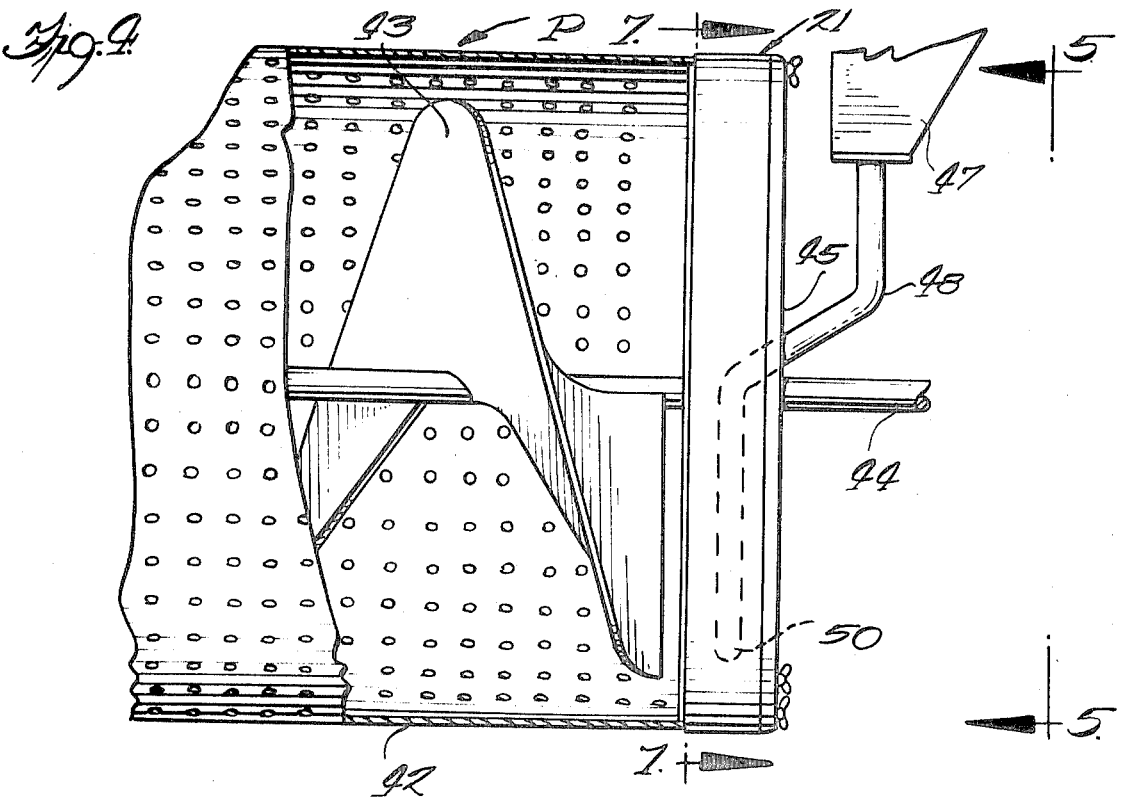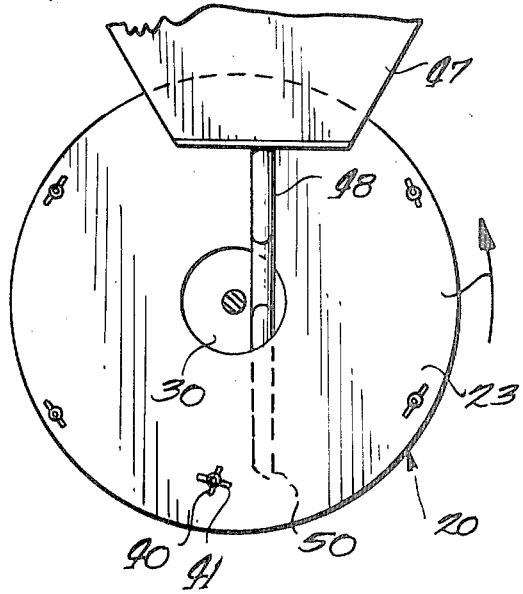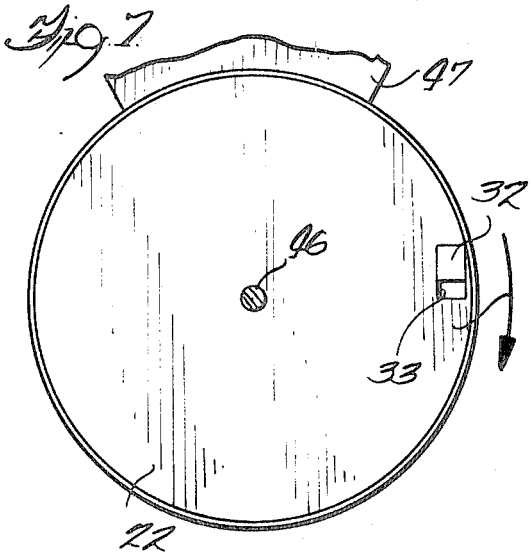

FEEDER APPARATUS FOR METERING A PREDETERMINED AMOUNT OF PRODUCT

BACKGROUND OF THE INVENTION

The field of the invention relates to a feeder apparatus for metering a predetermined amount of product, such as corn, from a hopper to a cooking machine. More particularly, the feeding apparatus is of the type that can be removably secured to and rotate with a rotatable drum of a corn popping machine and which automatically conveys a uniform amount of corn to the drum every revolution.

Various feeding apparatus for conveying products to a cooking machine have been employed in the past, however, such apparatus did not provide a consistent and uniform flow of product to the cooking area. Furthermore, these apparatus were not easy to maintain, repair and clean; did not provide for an adjustable feed; and consisted of several parts. Examples of prior art apparatus having these deficiencies are U.S. Pat. Nos. 1,586,845, 1,976,425 and 3,458,326.

SUMMARY OF THE INVENTION

It is an object of the invention to provide an improved feeder apparatus which can be removably secured to a drum of a cooking machine and is capable of rotating for metering a predetermined amount of product from a product supply source to a cooking area.

A further object is to provide an improved feeder apparatus which has a product volume control that can be easily adjusted to vary the amount of product delivered to the cooking area per revolution of the rotating drum.

A still further object is to provide an improved feeder apparatus that is inexpensive, easy to maintain and which assures a uniform flow of product.

Other objects and advantages will become apparent from the description, drawings and claims.

One form of the invention comprises a rotatable apparatus for metering a predetermined amount of product which can be removably mounted on a drum of a cooking machine. The apparatus includes a casing having a chamber and an inlet port at one end for receiving a feed tube and a discharge outlet port at the other end for exiting product to the rotatable drum. A product volume control means is adapted to meter a uniform flow of a predetermined amount of product to the rotatable drum as the apparatus is rotated and product is caused to be swept into the measuring area and through the discharge opening.

BRIEF DESCRIPTION OF THE DRAWING

FIG. 1 is an exploded perspective view of the feeder apparatus embodying the invention;

FIG. 2 is an enlarged front elevational view of a certain component of the feeder apparatus shown in FIG. 1;

FIG. 3 is a side elevational view taken in the direction of line 3—3 of FIG. 2;

FIG. 4 is a side elevational view, partially broken away, of the feeder apparatus mounted on a cooking machine;

FIG. 5 is a front elevational view taken in the direction of line 5—5 of FIG. 4;

FIG. 6 is another front elevational view, partially broken away, taken in the direction of line 5—5 of FIG. 4; and FIG. 7 is a sectional view taken along line 7—7 of FIG. 4.

DESCRIPTION OF THE PREFERRED EMBODIMENT

Referring to the drawing, an improved feeder apparatus is shown in FIG. 1 and is generally indicated by the numeral 20. Feeder 20 is cylindrical in configuration and comprises a casing 21 which includes a pan member 22 and a cover plate 23 removably secured thereto by a suitable connecting means. Such connecting means may be threaded bolts 24 which are attached to the inside surface 25 of casing 21 and extend outwardly of the pan 22 and through openings 26 in the cover plate 23. Wingnuts 27 cooperate with bolts 24 and are employed to hold cover plate 23 in place.

Cover plate 23 and pan member 22 of casing 21 form a chamber 28 for receiving a product to be conveyed to a cooking area. An aperture 30 which acts as an inlet port is provided in cover plate 23, as shown in FIGS. 1, 5 and 6, and a discharge outlet port 31 (FIGS. 1, 2 and 3) is provided in pan member 22 for channeling the product fed into chamber 28 to a cooking machine. Discharge outlet port 31 includes a deflector or baffle member 32 that is suitably secured to casing 21, such as by spot welding. Deflector 32 is preferably inclined to facilitate the flow of product. Pan 22 is provided with a discharge aperture 33 which is located in close proximity to said deflector and is preferably rectangular in shape and longer than said deflector. (See FIGS. 2 and 3).

A product volume control, generally designated by the numeral 36, is located within casing 21 for uniformly controlling the amount of product conveyed to a cooking machine. Product volume control 36 has a curved regulator member 37 which extends generally coextensive over a portion of casing 21, as shown in FIGS. 1 and 6. Regulator member 37 is secured at one end to deflector 32 of discharge outlet port 31 by a suitable hinge connection H so that the regulator may be adjusted to different positions, as shown in FIG. 6. Regulator 37 is substantially the same width as pan 22 and forms, in conjunction with the outer edge of pan 22 and cover plate 23, a measuring area 39. Near the other end of regulator 37 a threaded bolt 38 is secured and extends outwardly of the side of the pan member 22. Cover plate 23 is provided with a slot 40 through which bolt 38 passes. (See FIGS. 1 and 6). A wingnut 41 is used to secure regulator 37 at a particular position within slot 40.

The described feeder apparatus has particular application for feeding corn to a corn popping machine. Referring to FIGS. 4–7, feeder 20 is shown mounted on a rotating drum 42 of a corn popping machine P. Pan member 22 may be suitably secured in any convenient manner so that it rotates with drum 42. A screw conveyor 43 with a center shaft 44 is disposed within the drum for conveying corn from inlet end 45 to a discharge end (not shown). Shaft 44 extends through aperture 46 in pan 22, aperture 30, and cover plate 23. A corn hopper 47, suitably mounted on corn popping machine P, has a feed tube 48 attached thereto. The feed tube 48 extends downwardly from the hopper, through aperture 30 and into chamber 28 and terminates above product volume control 36. An opening 50 is provided at the end of tube 48 for discharging the corn from hopper 47 and is preferably vertically disposed and faces downstream relative to the rotation of feeder 20, as indicated by the arrow in FIG. 6. The end of feed tube 48 is located in noninterfering relationship with the product volume control when the feeder is rotated.

The operation of the feeder in the production of popcorn will now be described with reference to FIGS. 4 and 6. Initially before rotation of the drum begins, corn is fed from hopper 47 through feed tube 48 into chamber 28 of the feeder 20. Once the corn C builds up in the chamber to substantially the upper level 51 of feed tube opening 50 the flow stops and the amount of corn in chamber 28 is set and ready for discharge. Rotation of the drum counterclockwise in the direction of the arrows in FIGS. 5 and 6 is then commenced which causes the product volume control 36 of the feeder to sweep into the buildup of corn. The corn fills up the measuring area 39 during the sweep which generally occurs after an approximate 90° rotation. The sweep distance B (FIG. 6) is generally less than the length of regulator 37. As the drum continues to rotate, the corn contained in measuring area 39 passes through discharge outlet opening and into the drum. The screw conveyor then pushes the corn along the bottom of the rotating drum where it is suspended and cooked by hot air passing through apertures in the rotating drum in a manner disclosed in the Oates et al., U.S. Pat. No. 3,214,844. Corn is continually fed into chamber 28 as the feeder rotates and by the time product volume control 36 completes one full revolution, the corn accumulation is built up to the level of the feed tube opening and is ready for the next discharge.

As mentioned hereinabove, an advantage of the feeder is the provision of a product volume control 37 that may be adjusted to increase or decrease the feed rate of product. Another advantage of the product volume control is that it may be used to increase the ratio of popped to unpopped corn kernels. For example, if by inspection at the discharge end of the drum it is determined that there is an undesirable amount of unpopped corn kernels, the flow rate through the popping machine may be reduced by loosening and adjusting the wing nut 41 and moving the curved regulator 37 closer to the outer edge or periphery of the feeder apparatus 20. Conversely, if so desired, the flow rate may be increased by moving regulator 37 toward the center of the feeder, thereby increasing the measuring area.

It is to be understood that the feeder may be used to feed cereal products other than corn to a cooking or toasting area and that the preceding description is an example of only one use of the apparatus. Furthermore, the feeder may be used with a stationary cooking machine rather than a rotating one and be separately rotated in any suitable manner. Also, any type of feed mechanism may be employed which assures that a predetermined amount of product is deposited in the chamber of the feeder on each revolution.

Preferably, the apparatus is manufactured from stainless steel, however, it may be formed from any other material resistant to corrosion and heat and which can be easily cleaned and maintained.

It is thus apparent that an improved feeder apparatus has been provided that assures a uniform flow of a predetermined amount of product is metered to a cooking area by positive displacement during rotation, that has a product volume control which can be adjusted, and that is inexpensive and easy to maintain.

While a particular embodiment of the invention has been shown, it is to be understood that the invention is not limited thereto since many minor modifications may be made which fall within the true spirit and scope of the invention.

The invention having thus been described, what is claimed and desired to be secured by Letters Patent is:

1. Rotatable apparatus for metering a predetermined amount of product which is adapted to be removably mounted on a drum of a cooking machine at the feed end thereof, said apparatus comprising a casing having a chamber, said casing including an inlet port at one end for receiving a feed tube and a discharge outlet port at the other end for exiting product to the drum; a product volume control means disposed within said casing and secured at a first end adjacent said discharge outlet port inwardly of the outer periphery of said casing and extending generally coextensively over a portion of said outer periphery and removably secured thereto at its other end to form with the casing a measuring area, said product volume control means adapted to meter a uniform flow of a predetermined amount of product to the rotatable drum, whereby as product is fed into said chamber and the apparatus is rotated, product is swept into said measuring area and then conveyed through said discharge outlet port.

2. The invention according to claim 1 wherein the casing is circular and comprises a pan and a cover plate removably secured thereto.

3. The invention according to claim 2 wherein said first end of the product volume control means is secured to said pan and said other end is removably secured to said cover plate.

4. The invention according to claim 3 wherein said first end of the product volume control means is hingedly connected to said pan adjacent the said discharge outlet port and said cover plate is provided with an elongated slot to receive a portion of said other end of the product volume control means, whereby the latter may be adjusted by moving said portion within said slot.

5. The invention according to claim 4 wherein the discharge outlet port includes a deflector for channeling product to a cooking machine.

6. Rotatable apparatus for metering a predetermined amount of product which is adapted to be removably mounted on a drum of a cooking machine at the feed end thereof, said apparatus comprising a casing having a chamber, said casing including an inlet port at one end and a discharge outlet port at the other end for exiting product to the drum; a product volume control means disposed within said casing and secured at a first end adjacent said discharge outlet port inwardly of the outer periphery of said casing and extending generally coextensively over a portion of said outer periphery and removably secured thereto at its other end to form with the casing a measuring area, said product volume control means adapted to meter a uniform flow of a predetermined amount of product to the rotatable drum; a feed tube extending through said inlet port and into the chamber and having at one end thereof an opening vertically disposed and facing downstream relative to the rotation of the feeder, said end of said feed tube located in noninterfering relationship with said product volume control means when said apparatus is rotated, whereby as product is fed into said chamber by said feed tube and the apparatus is rotated, product is swept into said measuring area and then conveyed through said discharge outlet port.

* * * * *